United States Patent
Preslicka

(10) Patent No.: US 12,521,273 B2
(45) Date of Patent: *Jan. 13, 2026

(54) BLOOD FLOW DIRECTION FAVORING CONDOM

(71) Applicant: David Preslicka, Sidney, NE (US)

(72) Inventor: David Preslicka, Sidney, NE (US)

( * ) Notice: Subject to any disclaimer, the term of this patent is extended or adjusted under 35 U.S.C. 154(b) by 428 days.

This patent is subject to a terminal disclaimer.

(21) Appl. No.: 17/994,083

(22) Filed: Nov. 25, 2022

(65) Prior Publication Data

US 2023/0090524 A1   Mar. 23, 2023

Related U.S. Application Data

(63) Continuation-in-part of application No. 15/786,331, filed on Oct. 17, 2017, now Pat. No. 11,534,332.

(51) Int. Cl.
*A61F 6/04* (2006.01)
*A61F 5/41* (2006.01)

(52) U.S. Cl.
CPC ............... *A61F 6/04* (2013.01); *A61F 5/41* (2013.01); *A61F 2005/414* (2013.01); *A61F 2006/048* (2013.01)

(58) Field of Classification Search
CPC ........ A61F 6/02; A61F 6/04; A61F 2006/048; A61F 5/41; A61F 2005/414
See application file for complete search history.

(56) References Cited

U.S. PATENT DOCUMENTS

| | | | | |
|---|---|---|---|---|
| 5,513,652 A | * | 5/1996 | Schwartz | A61F 5/41 128/842 |
| 5,622,186 A | * | 4/1997 | Schwartz | A61F 6/04 600/38 |
| 5,855,206 A | * | 1/1999 | Ireland | A61F 6/04 128/842 |
| 9,295,579 B1 | * | 3/2016 | Bublick | A61F 5/41 |
| 9,844,458 B2 | * | 12/2017 | Yun | A61F 6/04 |
| 11,534,332 B1 | * | 12/2022 | Preslicka | A61F 6/04 |
| 2012/0073580 A1 | * | 3/2012 | Chuah | A61F 6/04 264/299 |
| 2013/0014764 A1 | * | 1/2013 | Rojas | A61F 6/04 128/844 |
| 2022/0202608 A1 | * | 6/2022 | Li | A61F 6/04 |

FOREIGN PATENT DOCUMENTS

RU            2337650 C1 * 11/2008 ............ A61F 6/005

* cited by examiner

*Primary Examiner* — Keri J Nelson
(74) *Attorney, Agent, or Firm* — Leyendecker & Lemire

(57) ABSTRACT

A condom is described in the form of a generally cylindrical sheath that extends along a central axis having an open end configured to accept a penis and an opposing closed end. On the inside surface of the sheath, one or more annular ribs are provided that extend radially inwardly towards the sheath's longitudinal axis. The ribs are configured to provide a greater hindrance to blood flow within a penis received in the condom in the direction of the open end as opposed to blood flow in the direction of the closed end.

13 Claims, 2 Drawing Sheets

BLOOD FLOW DIRECTION FAVORING CONDOM

RELATED ART

This application is a Continuation In Part of co-pending U.S. patent application Ser. No. 15/786,331 filed on Oct. 17, 2017 having the same inventor and title as the present application, which is incorporated by reference herein.

BACKGROUND OF THE INVENTION

The blood-flow mechanism by which an erection is achieved is reasonably well understood. The nervous system allows the fibers of the dorsal artery to relax in response a response to certain stimulation. The relaxation of the dorsal artery allows increased blood flow into the penis. This increased blood flow allows the fibers of the corpora cavernosa to fill with blood. Additionally, blood flow out of the penis through the deep artery is inhibited by the flow and retention of the blood by the expansion of the corpora. Thus, the increased blood flow expands the sinusoidal spaces in the corpora and the penis becomes erect. More specifically, blood from the body enters the penis through the profunda and dorsal arteries. Blood is then circulated through the penis and accumulated in corpora, and then leaves the organ through the subcutaneous dorsal vein, and then the deep dorsal veins and the subcutaneous lateral veins of the penis.

DETAILED DESCRIPTION

Figure 1:
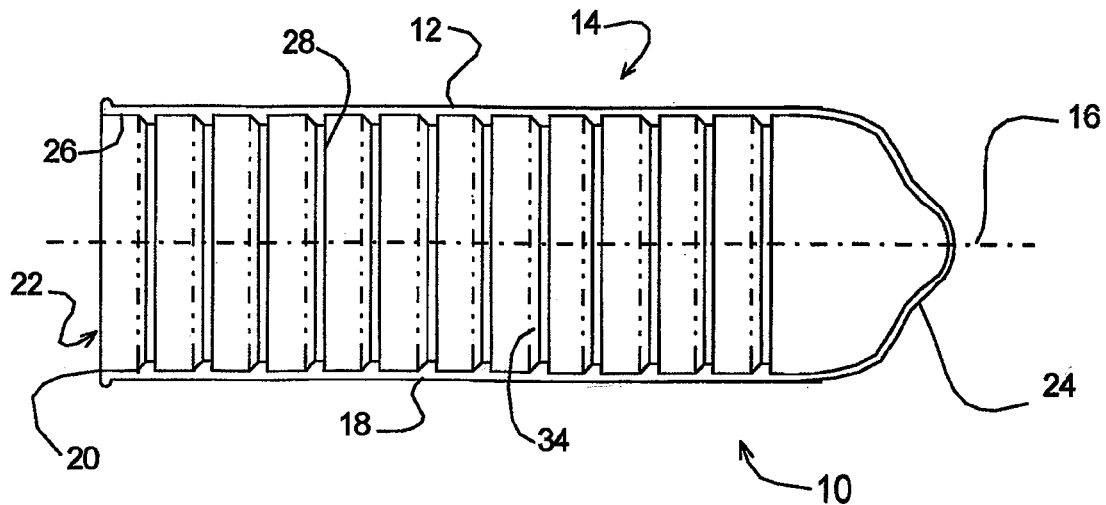
FIG. 1 is cross-sectional side view of a generally cylindrical condom along its length according to an embodiment of the present invention.

Embodiments of the invention comprise a condom in the form of a generally cylindrical sheath that extends along a central axis. The cylindrical sheath has an open end configured to accept a penis and an opposing closed end. The wall of the sheath is typically thin and comprised of a elastomeric material, such as a polymeric elastomer. On the inside surface of the sheath, one or more annular ribs are provided that extend radially inwardly towards the sheath's longitudinal axis. Advantageously, the ribs are configured to provide a greater hindrance to blood flow within a penis received in the condom in the direction of the open end as opposed to blood flow in the direction of the closed end.

Because of the ribs' configuration permitting differential blood flow depending on the direction of flow within an associated penis, the condom acts to increase the retention of blood within an erect penis. In use, each of the specifically configured ribs present a gradual increase in impedance to the flow of blood through the profunda and dorsal arteries as the blood flows towards the closed end while more significantly restricting the return flow of blood just below the penis's surface from the closed end of the sheath towards the first end of the sheath through the veins, and more particularly, through subcutaneous dorsal vein. Accordingly, blood pressure in the profunda and dorsal arteries is favored to progressively increase along the penis from a location proximate the open end of the sheath towards a location proximate the closed end of the sheath ultimately enhancing an erection and permitting the erection to be maintained for a longer period than would be possible with a prior art condom or no condom at all.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The term "approximately," as used in this specification and appended claims, refers to plus or minus 10% of the value given.

The term "about," as used in this specification and appended claims, refers to plus or minus 20% of the value given.

The term "generally" as used in this specification and appended claims means mostly, or for the most part.

The term "substantially," as used in this specification and appended claims, means essentially or with only insignificant variation.

The term "sheath" as used herein refers to a flexible generally cylindrical thin-walled tube. For purposes of definiteness and clarity, the sheath is described and shown herein in its expanded form, such as when received over an erect penis. However, it is understood that the while sheath may take on a different form when wholly or partially collapsed, such as when packaged and when not received on a penis or other phallus-like cylinder, it nevertheless is considered to satisfy the characteristics described herein if it is capable of exhibiting those characteristics when expanded.

The term "rib" as used herein refers to an annular ridge that extends (i) around the inner surface of a sheath's circumferential wall, and (ii) radially inwardly from the interior surface of the circumferential wall toward a longitudinal axis of the sheath. The width, height and circumferential length of the rib can vary depending on a particular embodiment. Whereas a typical latex condom is about 2-4 mils in thickness, the height (or thickness) of a rib in various embodiments can vary from about 2 mils to 20 mils, more preferably about 3-10 mil, and most preferably 4-8 mils, although variations outside of these parameters are possible.

The phrases "rib apex" and "apex of the rib" refer to the structure or portion of the rib that is closest to the longitudinal axis, or put another way, it refers to the structure that is furthest from the the sheath's inner surface. In one of the described embodiments the rib apex comprises a planar apex surface, and in the other described embodiment the rib apex comprises a radiused or blunt point.

As used herein the phrases, "aft surface angle" and "forward surface angle" refer to angles measured between the inner surface of a sheath and the respective aft or forward surface. For each, the angles specified are considered to be facing towards the closed end as shown in FIG. 2.

Embodiments of a Blood Flow Direction Favoring Condom

Figure 2:
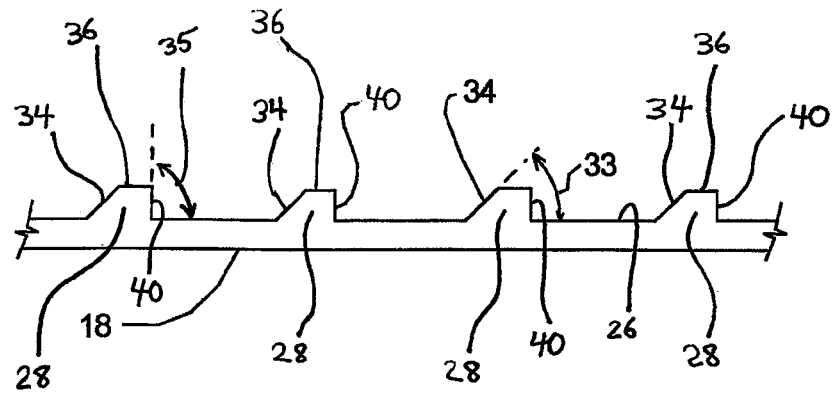
FIG. 2 illustrates a close up cross section of a portion of the circumferential wall of the condom of FIG. 1 according to the embodiment of the present invention.
Figure 4:
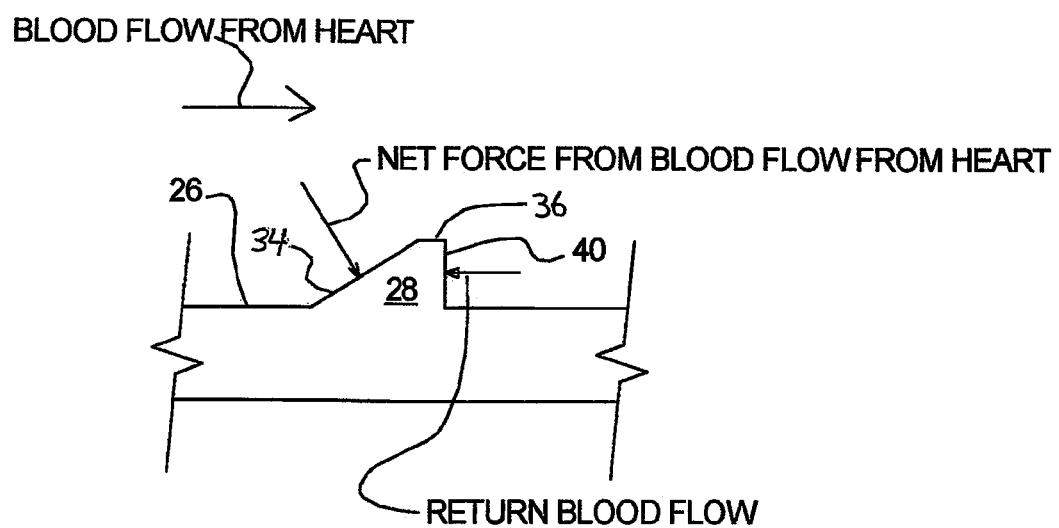
FIG. 4 illustrates a close-up cross section of the circumferential wall of the condom of FIG. 1 showing only a single inwardly extending rib according to the embodiment of the present invention.

FIGS. 1, 2 and 4 provide illustrations of one embodiment of the condom 10 of the present invention. Generally, the condom comprises a elongated cylindrical sheath 14 extending along a longitudinal axis 16 between an open end 22 and a closed end 24 and having an inner surface 26 and an outer surface 18. The inner surface is substantially parallel to the longitudinal axis. As illustrated, the outer surface of the sheath is substantially smooth although variations with textured surfaces and/or other protruding surface features as may be desired to ostensibly increase pleasure can be provided. Importantly, a plurality of radially inwardly extending annular ribs 28 of a configuration described below primarily with reference to FIGS. 2 and 4 extend from the inner surface. The thin-walled sheath is typically unitarily made of an elastomeric polymeric material.

FIG. 2 shows a close up cross sectional view of the sheath wall along its length. The ribs 28 extend radially inwardly from the inner surface 26 of the sheath a predetermined distance. The ribs are generally orthogonal to longitudinal axis 16 and the inner surface. Each rib includes a planar forward surface 34 that faces towards the open end 22 and is canted at a forward surface angle 33 of preferably less than 45 degrees, and more preferably less than 40 degrees, relative to the inner surface such that it extends toward the longitudinal axis and the closed end 24. When considered relative to the entire annular rib, the forward surface is frustoconical in shape.

At the innermost end of the forward surface it interfaces with a planar apex surface 36 at the apex of the rib. As illustrated, the planar apex surface is substantially longitudinally parallel to the longitudinal axis although in variations it can also be canted. The apex surface extends longitudinally towards the closed end 24 until intersecting with and terminating at an aft surface 40 that generally faces the closed end 24. In this embodiment the aft surface is substantially orthogonal to the inner surface 26 extending radially between the intersection with the planar apex surface 36 and the inner surface of the sheath and forming an aft surface angle 35 of substantially 90 degrees. In other variations the aft surface angle can vary between 60 to 120 degrees and more preferably between 75 and 105 degrees. As illustrated and like the other rib surfaces in this embodiment, the aft surface is substantially planar, although in variations it need not be.

Referring to FIG. 4, the functionality of the novel-shaped ribs is described herein. When worn on a penis, the forward surface 34 of each of the ribs 28 provides a gradually increasing impedance to the flow of blood through the profunda and dorsal arteries as the blood flows from the open end 22 of the sheath 14 towards the second end 24. However, the gradual sloping of the frustoconical forward surface toward the apex surface 36 will permit blood flow into the penis and beyond the rib towards the second end 24. In sharp and significant contrast, return blood flowing from the closed end 24 towards the open end 22 (i.e., returning towards the heart) will encounter the aft surface 40, which impedes blood from leaving the erect penis.

Twelve ribs 28 are illustrated in FIG. 1 but the actually number of ribs provided in other embodiments of the condom can vary significantly. Some embodiments may have as few as one wherein others can include two to eleven, and yet others can have more than 12. Further, the dimensions of the ribs can vary: some condoms may have ribs may be thicker than those on other embodiments of the condom; the thickness of the ribs may even vary on a particular embodiment with certain ribs at certain longitudinal positions having a greater thickness than other rims at other longitudinal positions; the slope (i.e. angle 33) of the forward surface can vary in other embodiments and even among ribs in a particular embody depending on a rib's position along the condom's length; and further the various surfaces need not be planar as is discussed in more detail below.

Figure 3:
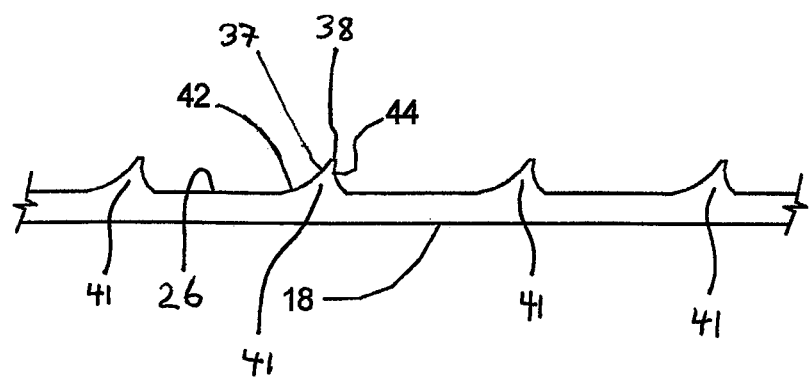
FIG. 3 illustrates a close up cross section of a portion of a circumferential wall of a condom according to another embodiment of the present invention.

FIG. 3 shows a close up cross sectional view of a sheath wall along its length of another condom embodiment. Essentially, the condom is substantially similar to the embodiment of FIGS. 1 & 2, except for its differently shaped ribs 41. As shown the forward surface 37 is not planar incorporating a radius transition 42 between it and the inner surface 26. Further, the forward surface may be curved although the average effective angle of the surface relative to the longitudinal axis 16 will be similar to the forward surface angle 33 of the embodiment of FIG. 1. Additionally, the rib apex of each rib may not include a planar top surface but rather come to a point or blunt point 38 that intersects with a curved aft surface 44 instead of the linear radially orthogonal aft surface 40 of the FIG. 1 embodiment. Of importance concerning both embodiments, the aft surface will form a steep aft surface angle 35 (typically 75-105 degrees) relative to the inner surface 26 thereby providing similar functionality as the ribs 28 of the FIG. 1 embodiment. It is to be appreciated that in other embodiments and variations the aft surface may also be reversely canted such that at its intersection with the rib apex, the aft surface is closer to a common location on the closed end than at its intersection with the inner surface.

It should also be understood that while the above and other advantages and results of the present invention will become apparent to those skilled in the art from the detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

I claim:

1. A condom comprising:
    an elongated sheath having a longitudinal axis with an open end configured to receive a penis and an opposing closed end, the sheath having (1) an outer surface, (2)

an inner surface substantially parallel to the longitudinal axis, and (3) a plurality of annular ribs extending radially inwardly from the inner surface, each rib of the plurality of annular ribs including (i) a frustoconical forward surface rising from the inner surface canted at a forward surface angle of no more than 45 degrees relative to the inner surface and generally facing the open end, (ii) a rib apex intersecting with the frustoconical forward surface, and (iii) an aft surface intersecting with the rib apex and the inner surface that generally faces the closed end, the aft surface being canted at an aft surface angle of between 60 to 120 degrees relative to the inner surface.

2. The condom of claim 1, wherein the plurality of annular ribs comprises more than four annular ribs.

3. The condom of claim 1, wherein the plurality of annular ribs comprises more than eight annular ribs.

4. The condom of claim 1, wherein the forward surface angle is no more than 40 degrees.

5. The condom of claim 1, wherein the aft surface angle is between 75 to 105 degrees.

6. The condom of claim 1, wherein the aft surface angle is substantially 90 degrees.

7. The condom of claim 1, wherein the condom is unitarily formed.

8. The condom of claim 1, wherein rib apex comprises an apex surface, the apex surface being generally planar and generally parallel to the inner surface.

9. The condom of claim 1, wherein the forward surface is generally planar.

10. The condom of claim 1, wherein the aft surface is generally planar.

11. The condom of claim 1, wherein the outer surface is substantially smooth.

12. The condom of claim 1, wherein the outer surface is textured.

13. A condom comprising an elongated sheath having a longitudinal axis with an open end configured to receive a penis and an opposing closed end, the sheath having (1) an outer surface, (2) an inner surface substantially parallel to the longitudinal axis, and (3) a plurality of annular ribs extending radially inwardly from the inner surface, wherein the plurality of annular ribs are configured to allow for sufficient blood flow in a penis on which the condom is received toward the closed end while at least partially inhibiting the blood flow in the penis towards the open end.

* * * * *